United States Patent
Ogata et al.

(10) Patent No.: US 10,476,066 B2
(45) Date of Patent: Nov. 12, 2019

(54) LAMINATED BODY

(71) Applicant: Sumitomo Chemical Company, Limited, Tokyo (JP)

(72) Inventors: Toshihiko Ogata, Osaka (JP); Kosuke Kurakane, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 122 days.

(21) Appl. No.: 15/627,585

(22) Filed: Jun. 20, 2017

(65) Prior Publication Data
US 2017/0365832 A1    Dec. 21, 2017

(30) Foreign Application Priority Data
Jun. 21, 2016  (JP) ................. 2016-123057

(51) Int. Cl.
| | |
|---|---|
| *H01M 2/16* | (2006.01) |
| *H01M 10/0525* | (2010.01) |
| *H01M 10/0585* | (2010.01) |
| *B05D 1/18* | (2006.01) |
| *B05D 1/42* | (2006.01) |

(52) U.S. Cl.
CPC ....... *H01M 2/1686* (2013.01); *H01M 2/1653* (2013.01); *H01M 10/0525* (2013.01); *H01M 10/0585* (2013.01); *B05D 1/18* (2013.01); *B05D 1/42* (2013.01)

(58) Field of Classification Search
None
See application file for complete search history.

(56) References Cited

U.S. PATENT DOCUMENTS

| 3,931,446 A | 1/1976 | Murayama et al. |
| 5,051,183 A | 9/1991 | Takita et al. |
| (Continued) |

FOREIGN PATENT DOCUMENTS

| CN | 1933923 A | 3/2007 |
| EP | 0834941 A1 | 4/1998 |
| (Continued) |

OTHER PUBLICATIONS

Office Action dated Aug. 18, 2017 in KR Application No. 10-2017-0041604.

(Continued)

*Primary Examiner* — Daniel S Gatewood
(74) *Attorney, Agent, or Firm* — Panitch Schwarze Belisario & Nadel LLP

(57) ABSTRACT

A nonaqueous electrolyte secondary battery separator having a laminated body which is not easily curled is provided. The laminated body includes a porous base material containing a polyolefin-based resin as a main component and a porous layer which is disposed on at least one surface of the porous base material and which contains a polyvinylidene fluoride-based resin. The porous base material has a piercing strength of not less than 26.0 gf/g/m². The polyvinylidene fluoride-based resin contains crystal form α in an amount of not less than 36 mol % with respect to 100 mol % of a total amount of the crystal form α and crystal form β contained in the polyvinylidene fluoride-based resin.

6 Claims, 1 Drawing Sheet

(56) References Cited

U.S. PATENT DOCUMENTS

| | | | |
|---|---|---|---|
| 7,208,555 | B2 | 4/2007 | Tada et al. |
| 8,931,647 | B2 | 1/2015 | Shiki et al. |
| 9,508,975 | B1 | 11/2016 | Matsuo |
| 10,074,840 | B2 | 9/2018 | Honda et al. |
| 2006/0014912 | A1 | 1/2006 | Araki et al. |
| 2007/0072069 | A1 | 3/2007 | Yamada et al. |
| 2007/0092705 | A1 | 4/2007 | Lee et al. |
| 2007/0190334 | A1 | 8/2007 | Araki et al. |
| 2007/0232709 | A1 | 10/2007 | Lee et al. |
| 2009/0101600 | A1 | 4/2009 | Shiki et al. |
| 2009/0111025 | A1 | 4/2009 | Lee et al. |
| 2009/0148659 | A1 | 6/2009 | Ishiodori et al. |
| 2010/0285341 | A1 | 11/2010 | Yun et al. |
| 2011/0212358 | A1 | 9/2011 | Usami et al. |
| 2011/0305940 | A1 | 12/2011 | Usami et al. |
| 2013/0089770 | A1 | 4/2013 | Nishikawa |
| 2013/0095365 | A1 | 4/2013 | Nishikawa |
| 2013/0196208 | A1 | 8/2013 | Nemoto |
| 2014/0178741 | A1 | 6/2014 | Hasegawa et al. |
| 2014/0272505 | A1 | 9/2014 | Yoon et al. |
| 2014/0363726 | A1 | 12/2014 | Honda et al. |
| 2015/0180002 | A1* | 6/2015 | Nishikawa .......... H01M 2/1686 429/144 |
| 2015/0188108 | A1 | 7/2015 | Miyazawa et al. |
| 2015/0263325 | A1 | 9/2015 | Honda et al. |
| 2017/0033347 | A1 | 2/2017 | Murakami et al. |
| 2017/0033348 | A1 | 2/2017 | Murakami et al. |
| 2017/0036832 | A1 | 2/2017 | Omura et al. |
| 2017/0098809 | A1 | 4/2017 | Ogata et al. |
| 2017/0141373 | A1 | 5/2017 | Murakami et al. |
| 2017/0170443 | A1 | 6/2017 | Murakami et al. |
| 2017/0365831 | A1 | 12/2017 | Ogata et al. |
| 2017/0365832 | A1 | 12/2017 | Ogata et al. |
| 2017/0365833 | A1 | 12/2017 | Ogata et al. |
| 2017/0365834 | A1 | 12/2017 | Ogata et al. |
| 2017/0365878 | A1 | 12/2017 | Ogata et al. |

FOREIGN PATENT DOCUMENTS

| | | | | |
|---|---|---|---|---|
| JP | S5117274 | A | | 2/1976 |
| JP | H06-104736 | B2 | | 12/1994 |
| JP | H11-40129 | A | | 2/1999 |
| JP | H1186844 | A | | 3/1999 |
| JP | H11300180 | A | | 11/1999 |
| JP | 2001-118558 | A | | 4/2001 |
| JP | 2005179562 | A | | 7/2005 |
| JP | 2005200623 | A | | 7/2005 |
| JP | 2005343957 | A | | 12/2005 |
| JP | 2008062229 | A | | 3/2008 |
| JP | 4247027 | B2 | | 4/2009 |
| JP | 2009104967 | A | | 5/2009 |
| JP | 2009185093 | A | | 8/2009 |
| JP | 2009-256404 | A | | 11/2009 |
| JP | 2010-540744 | A | | 12/2010 |
| JP | 201346998 | A | | 3/2013 |
| JP | 5355823 | B1 | | 11/2013 |
| JP | 5432417 | B2 | | 3/2014 |
| JP | 5553165 | B2 | | 7/2014 |
| JP | 2015111461 | A | | 6/2015 |
| JP | 2016-040354 | A | | 3/2016 |
| JP | 2016040354 | A | * | 3/2016 |
| JP | 2016-051695 | A | | 4/2016 |
| JP | 2016051695 | A | * | 4/2016 ........ H01M 10/0569 |
| JP | 5932161 | B2 | | 6/2016 |
| KR | 20060072065 | A | | 6/2006 |
| KR | 2006-0101541 | A | | 9/2006 |
| KR | 20060118668 | A | | 11/2006 |
| KR | 20090037552 | A | | 4/2009 |
| KR | 20130031319 | A | | 3/2013 |
| KR | 2013-0036043 | A | | 4/2013 |
| KR | 10-1430975 | B1 | | 8/2014 |
| KR | 101430975 | B1 | * | 8/2014 ................ C08J 5/18 |
| KR | 2014-0112668 | A | | 9/2014 |
| KR | 20140113186 | A | | 9/2014 |
| KR | 101479749 | B1 | | 1/2015 |
| KR | 20150020667 | A | | 2/2015 |
| KR | 10-1510972 | B1 | | 4/2015 |
| KR | 20160002173 | A | | 1/2016 |
| KR | 20160038918 | A | | 4/2016 |
| WO | 2007119850 | A1 | | 10/2007 |
| WO | 2008018181 | A1 | | 2/2008 |
| WO | 2012137375 | A1 | | 10/2012 |
| WO | 2013073503 | A1 | | 5/2013 |
| WO | 2013/099539 | A1 | | 7/2013 |
| WO | 2016152863 | A1 | | 9/2016 |

OTHER PUBLICATIONS

Mohammadi et al., "Effect of Tensile Strain Rate and Elongation on Crystalline Structure and Piezoelectric Properties of PVDF Thin Films" Polymer Testing, vol. 26, pp. 42-50 (2007).

Office Action dated Dec. 31, 2018 in U.S. Appl. No. 15/627,736 by Ogata.

Office Action dated Jul. 29, 2016 in KR Application No. 1020160077240.

Office Action dated Jun. 28, 2016 in JP Application No. 2016024163.

Office Action dated Nov. 29, 2016 in JP Application No. 2016-024163.

Office Action dated Dec. 21, 2016 in KR Application No. 10-2016-0077240.

Office Action dated Apr. 19, 2017 in KR Application No. 10-2016-0077240.

Martins et al, "Electroactive Phases of Poly(Vinylidene Fluoride): Determination, Processing, and Applications," Progress in Polymer Science, vol. 39, pp. 683-706 (2014).

Office Action dated May 16, 2017 in JP Application No. 2017033720.

Office Action dated Mar. 28, 2018 in CN Application No. 201610865635.7.

Office Action dated Aug. 18, 2017 in KR Application No. 10-2017-0041611.

Office Action dated Aug. 18, 2017 in KR Application No. 10-2017-0041366.

Office Action dated Aug. 18, 2017 in KR Application No. 10-2017-0041595.

Office Action dated Oct. 22, 2018 in U.S. Appl. No. 15/627,556 by Ogata.

Office Action dated Oct. 22, 2018 in U.S. Appl. No. 15/627,671 by Ogata.

Office Action dated Oct. 22, 2018 in U.S. Appl. No. 15/627,664 by Ogata.

Office Action dated Sep. 20, 2018 in U.S. Appl. No. 15/627,629 by Ogata.

* cited by examiner

LAMINATED BODY

This Nonprovisional application claims priority under 35 U.S.C. § 119 on Patent Application No. 2016-123057 filed in Japan on Jun. 21, 2016, the entire contents of which are hereby incorporated by reference.

TECHNICAL FIELD

The present invention relates to a laminated body, and more specifically, to a laminated body usable as a separator for a nonaqueous electrolyte secondary battery (hereinafter referred to as a "nonaqueous electrolyte secondary battery separator").

BACKGROUND ART

Nonaqueous electrolyte secondary batteries, particularly lithium-ion secondary batteries, have a high energy density, and are therefore in wide use as batteries for a personal computer, a mobile telephone, a portable information terminal, and the like. Such nonaqueous electrolyte secondary batteries have recently been developed as on-vehicle batteries.

In a nonaqueous electrolyte secondary battery, the electrodes expand and contract repeatedly as the nonaqueous electrolyte secondary battery is charged and discharged. The electrodes and the separator thus cause stress on each other. This, for example, causes the electrode active materials to be lost and consequently increases the internal resistance, unfortunately resulting in a degraded cycle characteristic. In view of that, there has been proposed a technique of coating the surface of a separator with an adhesive material such as polyvinylidene fluoride for increased adhesiveness between the separator and electrodes (see Patent Literatures 1 and 2). Coating a separator with an adhesive material, however, has been causing the separator to curl visibly. A curled separator cannot be handled easily during production, which may unfortunately lead to problems during battery preparation such as defective rolling and defective assembly.

CITATION LIST

Patent Literature

[Patent Literature 1]
Japanese Patent No. 5355823 (Publication Date: Nov. 27, 2013)
[Patent Literature 2]
Japanese Patent Application Publication, Tokukai, No. 2001-118558 (Publication Date: Apr. 27, 2001)

SUMMARY OF INVENTION

Technical Problem

The present invention has been accomplished in view of the above issue. It is an object of the present invention to sufficiently prevent a separator from curling.

Solution to Problem

The inventors of the present invention have discovered that a nonaqueous electrolyte secondary battery capable of sufficiently preventing curls can be produced by using, as a separator, a laminated body including (i) a porous base material containing a polyolefin-based resin as a main component and (ii) a porous layer disposed on the porous base material which porous layer contains a polyvinylidene fluoride-based resin (hereinafter also referred to as "PVDF-based resin"), the polyvinylidene fluoride-based resin having moderately controlled crystal forms. The inventors have also found that a nonaqueous electrolyte secondary battery separator can have an excellent rate characteristic maintaining ratio after a charge and discharge cycle in a case where the nonaqueous electrolyte secondary battery separator is a porous base material whose ratio of a traverse direction-critical load distance (T) measured in a scratch test to a machine direction-critical load distance (M) measured in a scratch test falls within a certain range.

The present invention can cover in its scope (i) the laminated body, (ii) a member for a nonaqueous electrolyte secondary battery (hereinafter referred to as a "nonaqueous electrolyte secondary battery member"), and (iii) nonaqueous electrolyte secondary battery below.

A laminated body in accordance with an embodiment of the present invention includes: a porous base material containing a polyolefin-based resin as a main component; and a porous layer on at least one surface of the porous base material, the porous layer containing a polyvinylidene fluoride-based resin, the porous base material having a piercing strength of not less than 26.0 gf/g/m$^2$, which piercing strength is measured with respect to a weight per unit area of the porous base material, the porous base material having a value in a range of 0.00 to 0.54, which value is represented by the following Expression (1):

$$|1-T/M| \qquad (1)$$

where (i) T represents a distance by which the porous base material moves in a traverse direction from a starting point of measurement to a point where a critical load is obtained in a scratch test under a constant load of 0.1 N and (ii) M represents a distance by which the porous base material moves in a machine direction from a starting point of measurement to a point where a critical load is obtained in a scratch test under a constant load of 0.1 N, the polyvinylidene fluoride-based resin containing crystal form α in an amount of not less than 36 mol % with respect to 100 mol % of a total amount of the crystal form α and crystal form β contained in the polyvinylidene fluoride-based resin, where the amount of the crystal form α is calculated from an absorption intensity at around 765 cm$^{-1}$ in an IR spectrum of the porous layer, and an amount of the crystal form β is calculated from an absorption intensity at around 840 cm$^{-1}$ in the IR spectrum of the porous layer.

The laminated body in accordance with an embodiment of the present invention is preferably arranged so that the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

The laminated body in accordance with an embodiment of the present invention is preferably arranged so that the polyvinylidene fluoride-based resin has a weight-average molecular weight of 200,000 to 3,000,000.

The laminated body in accordance with an embodiment of the present invention is preferably arranged so that the porous layer contains a filler.

The laminated body in accordance with an embodiment of the present invention is preferably arranged so that the filler has a volume-average particle size of 0.01 μm to 10 μm.

A nonaqueous electrolyte secondary battery member in accordance with an embodiment of the present invention includes a cathode, a laminated body in accordance with an embodiment of the present invention, and an anode, the cathode, the laminated body, and the anode being arranged in this order.

A nonaqueous electrolyte secondary battery in accordance with an embodiment of the present invention includes the laminated body in accordance with an embodiment of the present invention as a separator.

Advantageous Effects of Invention

A laminated body in accordance with an embodiment of the present invention is not easily curled.

DESCRIPTION OF EMBODIMENTS

Figure 1:
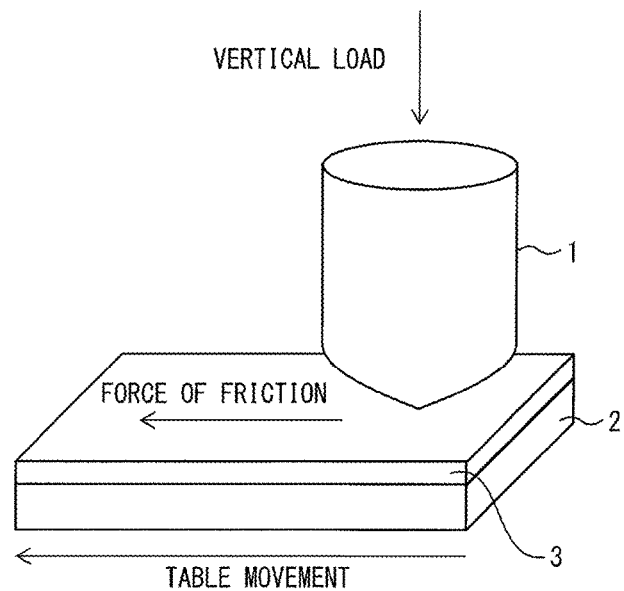
FIG. 1 is a view illustrating a device and an operation of the device in a scratch test in accordance with an embodiment of the present invention.

The following description will discuss an embodiment of the present invention in detail. Note that numerical expressions such as "A to B" herein mean "not less than A and not more than B".

Embodiment 1: Laminated Body

A laminated body in accordance with Embodiment 1 of the present invention includes: a porous base material containing a polyolefin-based resin as a main component; and a porous layer on at least one surface of the porous base material, the porous layer containing a polyvinylidene fluoride-based resin, the porous base material having a piercing strength of not less than 26.0 gf/g/m², which piercing strength is measured with respect to a weight per unit area of the porous base material, the porous base material having a value in a range of 0.00 to 0.54, which value is represented by the following Expression (1):

$$|1 - T/M| \quad (1)$$

where (i) T represents a distance by which the porous base material moves in a traverse direction (hereinafter also abbreviated as "TD") from a starting point of measurement to a point where a critical load is obtained in a scratch test under a constant load of 0.1 N and (ii) M represents a distance by which the porous base material moves in a machine direction (hereinafter also abbreviated as "MD") from a starting point of measurement to a point where a critical load is obtained in a scratch test under a constant load of 0.1 N (these distances may also be referred to as "critical load distance"), the polyvinylidene fluoride-based resin containing crystal form α in an amount of not less than 36 mol % with respect to 100 mol % of a total amount of the crystal form α and crystal form β contained in the polyvinylidene fluoride-based resin, where the amount of the crystal form α is calculated from an absorption intensity at around 765 $cm^{-1}$ in an IR spectrum of the porous layer, and an amount of the crystal form β is calculated from an absorption intensity at around 840 $cm^{-1}$ in the IR spectrum of the porous layer.

<Porous Base Material>

A porous base material in accordance with an embodiment of the present invention is a base material for a laminated body in accordance with an embodiment of the present invention, and contains polyolefin as a main component. The porous base material contains a large number of pores connected to one another, and allows a gas or a liquid to pass therethrough from one surface to the other. The porous base material may include a single layer or a plurality of layers.

The expression "containing a polyolefin-based resin as a main component" means that a polyolefin-based resin accounts for not less than 50% by volume, preferably not less than 90% by volume, more preferably not less than 95% by volume, of the entire porous base material. The polyolefin-based resin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because a laminated body including such a porous base material and a nonaqueous electrolyte secondary battery separator made of such a laminated body each have a higher strength.

Examples of the polyolefin-based resin which is a main component of the porous base material include, but are not particularly limited to, homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, and 1-hexene (which are thermoplastic resins). Among the above examples, polyethylene is preferable as it is capable of preventing (shutting down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

A thickness of the porous base material can be decided as appropriate in view of a thickness of a laminated body including the porous base material, and is preferably 4 μm to 40 μm, and more preferably 5 μm to 30 μm.

If the thickness of the porous base material is smaller than the above range, a nonaqueous electrolyte secondary battery including, as a nonaqueous electrolyte secondary battery separator, a laminated body including the porous base material will not be capable of sufficiently preventing an internal short circuit caused by, for example, breakage of the nonaqueous electrolyte secondary battery. Further, such a porous base material can retain only a smaller amount of electrolyte. If the thickness of the porous base material is larger than the above range, a laminated body including the porous base material, which is usable as a nonaqueous electrolyte secondary battery separator, will have an increased resistance to permeation of lithium ions over the entire region of the laminated body. Thus, in such a nonaqueous electrolyte secondary battery including, as a nonaqueous electrolyte secondary battery separator, a laminated body including the porous base material, the cathode is degraded as the nonaqueous electrolyte secondary battery repeats a charge and discharge cycle, with the result of a degraded discharge rate characteristic and/or a degraded cycle characteristic. Further, such a porous layer will increase the distance between the cathode and the anode, with the result of a larger nonaqueous electrolyte secondary battery.

The porous base material only needs to have a weight per unit area which weight is appropriately determined in view of the strength, thickness, weight, and handleability of the laminated body including the porous base material, which is usable as a nonaqueous electrolyte secondary battery separator. Specifically, the porous base material normally has a mass per unit area of preferably 4 g/m² to 20 g/m², more preferably 4 g/m² to 12 g/m², and still more preferably 5 g/m² to 10 g/m², so as to allow the battery, which includes a laminated body including the porous base material as a nonaqueous electrolyte secondary battery separator, to have a higher weight energy density and a higher volume energy density.

Piercing strength with respect to a weight per unit area of the porous base material is preferably not less than 26.0 gf/g/m², and more preferably not less than 30.0 gf/g/m². If the piercing strength is excessively small, that is, if the piercing strength is less than 26.0 gf/g/m² and if a laminated body including the porous base material is used as a separator, then the separator may be pierced by cathode active material particles and anode active material particles in a case where, for example, (i) an operation of laminating and winding a cathode, an anode, and the separator is carried out during a battery assembling process, (ii) an operation of pressing and tightening a wound group is carried out during a battery assembling process, or (iii) the battery is pressured from outside. This may cause a short circuit between the cathode and the anode.

The porous base material has an air permeability of preferably 30 sec/100 mL to 500 sec/100 mL, more preferably 50 sec/100 mL to 300 sec/100 mL, in terms of Gurley values. A porous base material having such an air permeability allows a laminated body including the porous base material, which is usable as a nonaqueous electrolyte secondary battery separator, to achieve sufficient ion permeability.

The porous base material has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature.

If the porosity of the porous base material is less than 20% by volume, the porous base material will have an increased resistance. If the porosity of the porous base material is more than 80% by volume, the porous base material will have a decreased mechanical strength.

Further, in order for a laminated body including the porous base material, which is usable as a nonaqueous electrolyte secondary battery separator, to obtain sufficient ion permeability and prevent particles from entering the cathode and/or the anode when the laminated body is used as a nonaqueous electrolyte secondary battery separator, the porous base material has pores each having a pore size of preferably not larger than 0.3 µm, more preferably not larger than 0.14 µm.

The porous base material in accordance with an embodiment of the present invention has a value represented by the following Expression (1), which value is in a range of 0.00 to 0.54, preferably 0.00 to 0.50, and more preferably 0.00 to 0.45:

$$|1-T/M| \qquad (1)$$

where (i) T represents a critical load distance in a traverse direction in a scratch test under a constant load of 0.1 N and (ii) M represents a critical load distance in a machine direction in a scratch test under a constant load of 0.1 N.

The porous base material in accordance with an embodiment of the present invention has a value represented by the following Expression (2), which value is in a range of preferably 0.00 to 0.54, more preferably 0.00 to 0.50, and still more preferably 0.00 to 0.45:

$$1-T/M \qquad (2)$$

where (i) T represents a critical load distance in a traverse direction in a scratch test under a constant load of 0.1 N and (ii) M represents a critical load distance in a machine direction in a scratch test under a constant load of 0.1 N.

The respective values represented by the Expression (1) and the Expression (2) are each a value indicating anisotropy of a critical load distance in a scratch test. A value that is closer to zero indicates that the critical load distance is more isotropic.

Figure 2:
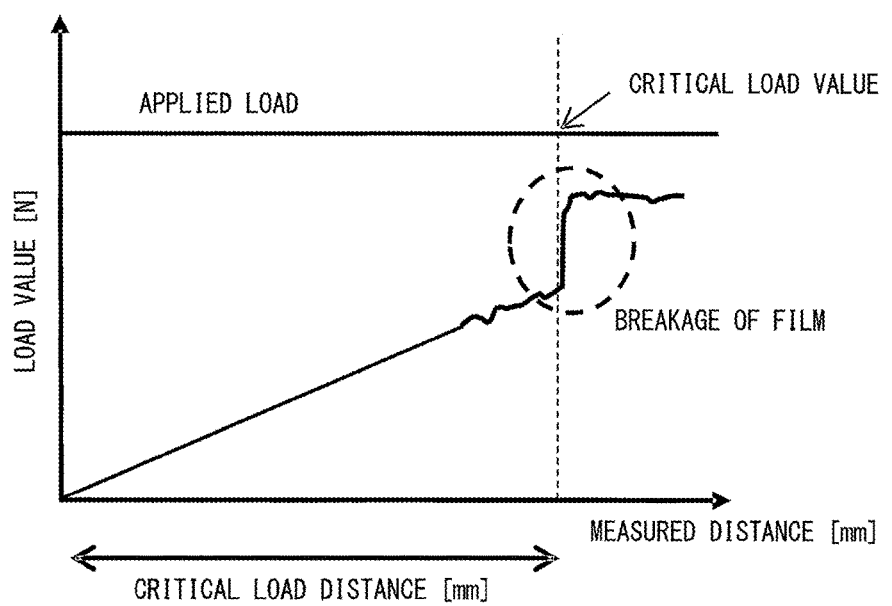
FIG. 2 is a graph which is based on results of a scratch test in accordance with an embodiment of the present invention and which shows a relationship between (i) a load value and (ii) a distance by which a porous base material moves from a starting point of measurement to a point where the critical load is obtained.

As illustrated in FIG. 1, "scratch test" in accordance with an embodiment of the present invention is a test for measuring stress that occurs in a distance by which an indenter is moved in a horizontal direction while a surface layer of the porous film is subjected to compressive deformation in a thicknesswise direction by applying a certain load to the indenter (i.e. while the indenter is pressed down). Specifically, the scratch test is carried out by the following steps:
(1) A porous base material, which is to be measured and is a nonaqueous electrolyte secondary battery separator, is cut into a piece of 20 mm×60 mm. Then, a preparation is made by combining the piece of the porous base material and a glass plate of 30 mm×70 mm by the use of aqueous liquid glue. Then, the preparation is dried at a temperature of 25° C. for one whole day and night, so that a test sample is prepared. Note that the piece of the porous base material and the glass plate are to be combined with care so that no air bubbles are made between the piece of the porous base material and the glass plate.
(2) The test sample prepared in the step (1) is placed on a microscratch testing device (manufactured by CSM Instruments). Then, while a diamond indenter of the testing device is applying a vertical load of 0.1 N to the test sample, a table of the testing device is moved by a distance of 10 mm in a traverse direction of the porous base material at a speed of 5 mm/min. During the movement of the table, stress (force of friction) that occurs between the diamond indenter and the test sample is measured.
(3) A line graph, which shows a relationship between a displacement of the stress measured in the step (2) and the distance of the movement of the table, is made. Then, based on the line graph, the following are calculated as illustrated in FIG. 2: (i) a critical load value in the traverse direction and (ii) a distance in the traverse direction between a starting point of measurement and a point where the critical load is obtained.

(4) The direction of the movement of the table is changed to a machine direction, and the above steps (1) through (3) are repeated. Then, the following are calculated: (i) a critical load value in the machine direction and (ii) a critical load distance in the machine direction.

Any conditions and the like for the measurement in the scratch test other than the conditions described above are similar to those disclosed in JIS R 3255.

The scratch test measures and calculates the following effect in a nonaqueous electrolyte secondary battery in which a laminated body including the porous base material to be measured is incorporated as a separator or as a member of a separator. Specifically, the scratch test measures and calculates, by modeling a mechanism of the effect, the effect of expansion of an electrode mix layer during battery charge/discharge (an anode expands during charge, and a cathode expands during discharge) on (i) adhesion at an interface between an expanded electrode and a first surface layer of the separator base material (porous base material) which first surface layer faces the expanded electrode and (ii) adhesion at an interface between a second surface layer and a corresponding electrode, which second surface layer is opposite the first surface layer.

Note that the expansion and shrinkage of the electrode mix layer during charge/discharge causes a surface layer of the separator base material (porous base material), which surface layer faces the expanded electrode, to be deformed (compressive deformation) in a thicknesswise direction by expanded active material particles with which the surface layer is in contact. In addition, the expansion of the mix layer in a horizontal direction causes shearing stress (force which occurs in the horizontal direction and which occurs at the interface between the separator and the electrode) to occur via the particles that deformed the separator base material (porous base material) in the thicknesswise direction. Furthermore, the shearing stress is transferred, via a resin inside the separator, to an interface between the separator and an electrode, which interface is on a side opposite the side facing the expanded electrode.

Therefore, a critical load distance calculated by the scratch test serves as (a) an indicator of how easily a surface layer of a porous base material (separator base material) is plastically-deformed and (b) an indicator of how easily shearing stress is transferred to a surface opposite a measured surface. If a critical load distance is long, then it indicates that (a') a surface layer of a porous base material to be measured is unlikely be plastically-deformed and (b') shearing stress is unlikely (difficult) to be transferred to a surface opposite a measured surface of the porous base material to be measured.

Hence, a porous base material, which has a value beyond 0.54 as represented by the Expression (1), shows that there exists large anisotropy between a critical load distance in a traverse direction and a critical load distance in a machine direction. In a case of a nonaqueous electrolyte secondary battery in which a laminated body including a porous base material having large anisotropy is included as a separator or as a member of a separator, a plastic deformation of a surface layer of the separator base material (porous base material), which plastic deformation occurs as a result of charge/discharge, occurs predominantly in a certain direction. In addition, due to a difference in transferability of surface stress to a surface opposite a surface facing an expanded electrode between a traverse direction and a machine direction, a wrinkle and a gap which occur at an interface between the separator and the electrode occurs predominantly in a certain direction. This causes a decrease in surface-wise uniformity in distance between the electrodes, and therefore causes a reduction in rate characteristic maintaining ratio of the nonaqueous electrolyte secondary battery after a charge-discharge cycle.

The physical property values of the porous base material, which is included in a laminated body including the porous base material and a porous layer, can be measured after the porous layer is removed from the laminated body. The porous layer can be removed from the laminated body by, for example, a method of dissolving the resin of the porous layer with the use of a solvent such as N-methylpyrrolidone or acetone for removal.

The following description will discuss a nonaqueous electrolyte secondary battery which is configured so that a laminated secondary battery is wound. This configuration is one aspect of a laminated secondary battery including (i) electrodes and (ii) a separator which (a) is a laminated body including a porous base material or (b) includes, as a member of the secondary battery, a laminated body including a porous base material. Note that a laminated secondary battery herein refers to a nonaqueous electrolyte secondary battery having a structure in which electrodes and a separator (which is a laminated body including a porous base material) are disposed. In the nonaqueous electrolyte secondary battery which is configured so that the laminated secondary battery is wound, the laminated secondary battery is wound while tensile force is being applied in a machine direction to the separator. This causes an increase in smoothness in the machine direction of the porous base material, and causes internal stress to be inwardly applied to an axis extending in a traverse direction. Therefore, according to the nonaqueous electrolyte secondary battery configured so that the laminated secondary battery is wound, (i) a critical load distance in the machine direction during actual operation is longer than a critical load distance, in a machine direction, which is calculated by the scratch test and (ii) a critical load distance in the traverse direction is shorter than a critical load distance, in a traverse direction, which is calculated in the scratch test. Therefore, in a case where a critical load distance in the traverse direction and a critical load distance in the machine direction are similar (i.e. highly isotropic), specifically, in a case where a laminated body including a porous base material having a value of not less than −0.54 and less than 0.00 as represented by the Expression (2) is used as a separator or as a member of a separator in a nonaqueous electrolyte secondary battery configured so that a laminated secondary battery is wound, the critical load distance in the machine direction increases, so that the critical load distance in the traverse direction decreases. Therefore, in actual operation, a wrinkle and a gap, which are caused by the following factors (i) and (ii) and which occur at the interface between the separator and the electrode, occur predominantly in the traverse direction: (i) a plastic deformation of the surface layer of the separator base material (porous base material) in the traverse direction and (ii) a difference in transferability, between the transverse direction and the machine direction, of surface stress to a surface opposite the surface facing the expanded electrode. This causes a decrease in surface-wise uniformity in distance between the electrodes. Meanwhile, in a case where a nonaqueous electrolyte secondary battery configured so that the laminated secondary battery is wound has highly anisotropic critical load distances in a traverse direction and in the machine direction, specifically, in a case where the value obtained by the Expression (1) is beyond 0.54, the occurrences of the following wrinkles and gaps in a direction in which a critical load distance is longer increase for a reason similar to the reason described above: (i) a wrinkle and a gap which are caused by a plastic deformation of a surface layer of the separator base material (porous base material) and (ii) a wrinkle and a gap which occur at an interface between the separator and the expanded electrode and which are caused by a difference between a traverse direction and a machine direction in terms of transferability of surface stress to a surface opposite the surface facing the expanded electrode. This causes a reduction in a discharge rate characteristic maintaining ratio of the nonaqueous electrolyte secondary battery after a charge-discharge cycle. Therefore, the value obtained by the Expression (2) is preferably in a range of 0.00 to 0.54 in view of the fact that, with such a value, a laminated body including a porous base material can be suitably used for a nonaqueous electrolyte secondary battery configured so that the laminated secondary battery is wound.

Note that a critical load distance in a traverse direction and a critical load distance in a machine direction are considered to be greatly affected by the following structure factors of a porous base material:
(i) How polymers in a resin are aligned in the machine direction of the porous base material
(ii) How polymers in a resin are aligned in the traverse direction of the porous base material
(iii) How the polymers in the resin aligned in the machine direction and the polymers in the resin aligned in the traverse direction are in contact with each other with respect to a thicknesswise direction of the porous base material Therefore, respective values obtained by the Expression (1) and the Expression (2) can be controlled by, for example, controlling the above structure factors (i) through (iii) through adjusting the following production conditions under which a porous base material production method (described later) is carried out:
(1) Circumferential velocity [m/min] of a rolling mill roll
(2) Ratio of stretch temperature to stretch magnification [° C./%]

Specifically, the circumferential velocity of the rolling mill roll and the ratio of the stretch temperature to the stretch magnification during stretching are adjusted so that the circumferential velocity of the rolling mill roll, the stretch temperature during stretching, and the stretch magnification satisfy the relationship of a Formula (3) below, provided that production of the porous base material is not impaired. This allows the respective values obtained by the Expression (1) and the Expression (2) to be each controlled in a range of 0.00 to 0.54.

$$Y \geq -2.3 \times X + 22.2 \quad (3)$$

where (i) X represents the circumferential velocity of the rolling mill roll and (ii) Y represents the ratio of the stretch temperature to the stretch magnification during stretching in the traverse direction.

Meanwhile, in a case where the ratio is set so as to fall outside the range satisfying the relationship of the above Formula (3), (i) the alignment of the polymers in the resin in the machine direction of the porous base material or the alignment of the polymers in the resin in the traverse direction of the porous base material is promoted and/or (ii) connectivity, in a thicknesswise direction of the porous base material, of the polymers in the resin aligned in the machine direction or of the polymers in the resin aligned in the traverse direction is promoted. This causes the anisotropy of the porous base material as represented by the Expression (1) to be large, so that it is not possible to control the value obtained by the Expression (1) to fall within the range of 0.00 to 0.54. For example, in a case where the circumferential velocity of the rolling mill roll is adjusted to 2.5 m/min and where the ratio of the stretch temperature to the stretch magnification is adjusted to less than 16.5° C./%, (i) the alignment of the polymers in the resin in the traverse direction of the porous base material increases and (ii) the thicknesswise direction-wise connectivity of the polymers in the resin aligned in the traverse direction increases. This causes a critical load distance in the traverse direction to be short, so that the anisotropy as represented by the Expression (1) to be not less than 0.54.

The stretch temperature is preferably 90° C. to 120° C., and more preferably 100° C. to 110° C. The stretch magnification is preferably 600% to 800%, and more preferably 620% to 700%.

The structure factor (i) can be controlled mainly by the production condition (1). The structure factor (ii) can be controlled mainly by the production condition (2). The structure factor (iii) can be controlled mainly by a combination of the production conditions (1) and (2).

The porous base material can be a commercial product having the above described physical properties.

A laminated body in accordance with an embodiment of the present invention includes, on the porous base material, a later-described porous layer containing a polyvinylidene fluoride-based resin. The laminated body may further include a publicly known porous layer(s) such as an adhesive layer, a heat-resistant layer, and a protection layer as another porous layer. In a case where the laminated body in accordance with an embodiment of the present invention is produced, that is, in a case where the later-described porous layer containing a polyvinylidene fluoride-based resin is disposed on the porous base material, the porous base material is more preferably subjected to a hydrophilization treatment before the porous layer is formed, that is, before the porous base material is coated with a coating solution (described later). Performing a hydrophilization treatment on the porous base material further improves coating easiness of the coating solution and thus allows a more uniform porous layer to be formed. The hydrophilization treatment is effective in a case where water accounts for a high proportion of a solvent (dispersion medium) contained in the coating solution. Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible to not only hydrophilize the porous base material within a relatively short period of time, but also hydrophilize only a surface and its vicinity of the porous base material to leave the inside of the porous base material unchanged in quality.

<Porous Base Material Production Method>

A method of producing the porous base material is not limited to any particular one. Examples of the method encompass a method in which (i) a plasticizer is added to a resin such as polyolefin, (ii) a resultant mixture is formed into a film, and (iii) the plasticizer is removed with the use of a proper solvent.

Specifically, in a case where, for example, a porous film is to be produced with the use of a polyolefin resin containing ultra-high molecular weight polyethylene and low molecular weight polyolefin which has a weight-average molecular weight of not more than 10,000, the porous base material is preferably produced by, in view of production costs, the following method:

A method of obtaining a porous base material, including the steps of:

(1) kneading 100 parts by weight of ultra-high molecular weight polyethylene, 5 parts by weight to 200 parts by weight of low molecular weight polyolefin having a weight-average molecular weight of equal to or less than 10,000, and 100 parts by weight to 400 parts by weight of a pore forming agent such as a calcium carbonate or a plasticizer, so that a polyolefin resin composition is obtained;
(2) rolling the polyolefin resin composition, so as to form a rolled sheet;
(3) removing the pore forming agent from the rolled sheet;
(4) stretching the rolled sheet from which the pore forming agent has been removed in the step (3), so as to obtain a stretched sheet; and
(5) subjecting the stretched sheet to heat fixation at a heat fixation temperature of 100° C. to 150° C.

Alternatively, a method of obtaining a porous base material, including the steps of:

(1) kneading 100 parts by weight of ultra-high molecular weight polyethylene, 5 parts by weight to 200 parts by weight of low molecular weight polyolefin having a weight-average molecular weight of equal to or less than 10,000, and 100 parts by weight to 400 parts by weight of a pore forming agent such as a calcium carbonate or a plasticizer, so that a polyolefin resin composition is obtained;
(2) rolling the polyolefin resin composition, so as to form a rolled sheet;
(3') stretching the rolled sheet, so as to obtain a stretched sheet;
(4') removing the pore forming agent from the stretched sheet; and
(5') subjecting the stretched sheet, which has been thus obtained in the step (4'), to heat fixation at a heat fixation temperature of 100° C. to 150° C.

A porous base material satisfying the Expressions (1) and (2) can be produced by adjusting (i) the circumferential velocity of the rolling mill roll to be used in the rolling process in the step (2) and/or (ii) the ratio of the stretch temperature to the stretch magnification during stretching in the step (4) or in the step (3').

Specifically, it is preferable to adjust the circumferential velocity of the rolling mill roll and the ratio of the stretch temperature to the stretch magnification during stretching so as to satisfy the relationship of the following Formula (3):

$$Y \geq -2.3 \times X + 22.2 \qquad (3)$$

where (i) X represents the circumferential velocity of the rolling mill roll and (ii) Y represents the ratio of the stretch temperature to the stretch magnification during stretching in the traverse direction.

As a method of producing a porous base material that satisfies the Expression (1) and the Expression (2), it is preferable to further stretch the stretched film in a machine direction and in a traverse direction, particularly in a machine direction.

As an alternative method of producing a porous base material satisfying the Expressions (1) and (2), it is also preferable to (i) cool the stretched film after the heat fixation and then (ii) repeatedly carry out the stretching and the heat fixation.

Alternatively, a porous base material satisfying the Expressions (1) and (2) can be produced by properly combining, as needed, other conditions such as composition of the porous base material and the heat fixation temperature.

On the porous base material, a publicly known porous layer including, for example, an adhesive layer, a heat-resistant layer, and/or a protection layer can be provided. In a case where a porous layer is formed on a porous base material to produce a laminated body in accordance with an embodiment of the present invention, it is preferable to subject the porous base material to a hydrophilization treatment before the porous layer is formed, that is, before a coating solution (described later) is applied. Performing a hydrophilization treatment on the porous base material further improves coating easiness of the coating solution and thus allows a more uniform porous layer to be formed. The hydrophilization treatment is effective in a case where water accounts for a high proportion of a solvent (dispersion medium) contained in the coating solution. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is more preferable because a corona treatment allows a porous base material to be hydrophilized in a relatively short period of time and causes only a part in the vicinity of a surface of the porous base material to be hydrophilized, so that the inside of the porous base material remains unchanged in quality.

[Porous Layer]

The porous layer in accordance with an embodiment of the present invention contains a polyvinylidene fluoride-based resin, the polyvinylidene fluoride-based resin containing crystal form α in an amount of not less than 36 mol % with respect to 100 mol % of the total amount of the crystal form α and crystal form β contained in the polyvinylidene fluoride-based resin.

The amount of crystal form α is calculated from the absorption intensity at around 765 $cm^{-1}$ in the IR spectrum of the porous layer, while the amount of crystal form β is calculated from the absorption intensity at around 840 $cm^{-1}$ in the IR spectrum of the porous layer.

The porous layer in accordance with an embodiment of the present invention contains a polyvinylidene fluoride-based resin (PVDF-based resin). The porous layer contains a large number of pores connected to one another, and thus allows a gas or a liquid to pass therethrough from one surface to the other. Further, in a case where the porous layer in accordance with an embodiment of the present invention is used as a constituent member of a nonaqueous electrolyte secondary battery separator, the porous layer can be a layer capable of adhering to an electrode as the outermost layer of the separator.

Examples of the PVDF-based resin include homopolymers of vinylidene fluoride (that is, polyvinylidene fluoride); copolymers (for example, polyvinylidene fluoride copolymer) of vinylidene fluoride and other monomer(s) copolymerizable with vinylidene fluoride; and mixtures of the above polymers. Examples of the monomer copolymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous base material layer) included in a nonaqueous electrolyte secondary battery separator, with the result of a higher peel strength between the two layers, than a porous layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably in a range of 200,000 to 3,000,000. A PVDF-based resin having a weight-average molecular weight of not less than 200,000 tends to allow a porous layer to attain a mechanical property enough for the porous layer to endure a process of adhering the porous layer to an electrode, thereby allowing the porous layer and the electrode to adhere to each other sufficiently. A PVDF-based resin having a weight-average molecular weight of not more than 3,000,000 tends to not cause the coating solution, which is to be applied to form a porous layer, to have too high a viscosity, which allows the coating solution to have excellent shaping easiness. The weight-average molecular weight of the PVDF-based resin is more preferably 200,000 to 2,000,000, further preferably 500,000 to 1,500,000.

The PVDF-based resin has a fibril diameter of preferably 10 nm to 1000 nm in view of the cycle characteristic of a nonaqueous electrolyte secondary battery containing the porous layer.

The porous layer in accordance with an embodiment of the present invention may contain a resin other than the PVDF-based resin. Examples of the other resin include styrene-butadiene copolymers; homopolymers or copolymers of vinyl nitriles such as acrylonitrile and methacrylonitrile; and polyethers such as polyethylene oxide and polypropylene oxide.

The porous layer in accordance with an embodiment of the present invention may contain a filler. The filler may be an inorganic or organic filler. In a case where the porous layer in accordance with an embodiment of the present invention contains a filler, the filler is contained at a proportion of preferably not less than 1% by mass and not more than 99% by mass, more preferably not less than 10% by mass and not more than 98% by mass, with respect to the total amount of the polyvinylidene fluoride-based resin and the filler combined. In a case where the filler content falls within these ranges, it is less likely for a void, which is formed when fillers come into contact with each other, to be blocked by a resin or the like. This makes it possible to achieve sufficient ion permeability and a proper weight per unit area. Containing a filler allows a separator including the porous layer to have improved slidability and heat resistance, for example. The filler may be any inorganic or organic filler that is stable in a nonaqueous electrolyte and that is stable electrochemically. The filler preferably has a heat-resistant temperature of not lower than 150° C. to ensure safety of the battery.

Examples of the organic filler include: crosslinked polymethacrylic acid esters such as crosslinked polyacrylic acid, crosslinked polyacrylic acid ester, crosslinked polymethacrylic acid, and crosslinked polymethyl methacrylate; fine particles of crosslinked polymers such as crosslinked polysilicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; and fine particles of heat-resistant polymers such as polysulfone, polyacrylonitrile, polyamid, polyacetal, and thermoplastic polyimide.

A resin (polymer) contained in the organic filler may be a mixture, a modified product, a derivative, a copolymer (a random copolymer, an alternating copolymer, a block copolymer, or a graft copolymer), or a crosslinked product of any of the molecular species listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia, and hydrates thereof; carbonates such as calcium carbonate and magnesium carbonate; sulfates such as barium sulfate and calcium sulfate; and clay minerals such as calcium silicate and talc. The inorganic filler is preferably a metal hydroxide, a hydrate of a metal oxide, or a carbonate to improve the safety of the battery, for example, to impart fire retardance. The inorganic filler is preferably a metal oxide in terms of insulation and oxidation resistance.

The present invention may use (i) only one filler or (ii) two or more kinds of fillers in combination. Alternatively, the organic filler(s) and the inorganic filler(s) may be used in combination.

The filler has a volume-average particle size of preferably 0.01 μm to 10 μm in order to ensure (i) fine adhesion and fine slidability and (ii) shaping easiness of the laminated body. The volume average particle size has a lower limit of more preferably not less than 0.05 μm, further preferably not less than 0.1 μm. The volume average particle size has an upper limit of more preferably not more than 5 μm, further preferably not more than 1 μm.

The filler may have any shape. The filler may, for example, be a particulate filler. Example shapes of the particles include a sphere, an ellipse, a plate shape, a bar shape, and an irregular shape. In order to prevent a short circuit in the battery, the filler is preferably (i) plate-shaped particles or (ii) primary particles that are not aggregated.

The filler forms fine bumps on a surface of the porous layer, thereby improving the slidability. A filler including (i) plate-shaped particles or (ii) primary particles that are not aggregated forms finer bumps on a surface of the porous layer so that the porous layer adheres better to an electrode.

The porous layer for in accordance with an embodiment of the present invention has an average thickness of preferably 0.5 μm to 10 μm, more preferably 1 μm to 5 μm, on one surface of the porous base material in order to ensure adhesion to an electrode and a high energy density.

If the porous layer has a thickness of less than 0.5 μm on one surface of the porous base material, it will be impossible to, in a case where the laminated body is used as a nonaqueous electrolyte secondary battery separator, sufficiently prevent an internal short circuit caused by, for example, breakage of the battery. Further, such a porous layer can retain only a smaller amount of electrolyte. If the porous layer has a thickness of more than 10 μm on one surface of the porous base material, the laminated body as a nonaqueous electrolyte secondary battery separator will have an increased resistance to permeation of lithium ions over the entire region of the separator. Thus, repeating charge-and-discharge cycles will degrade the cathode, with the result of a degraded discharge rate characteristic and a degraded cycle characteristic. Further, such a porous layer will increase the distance between the cathode and the anode, with the result of a larger nonaqueous electrolyte secondary battery.

In a case where the porous layer is disposed on both surfaces of the porous base material, the physical properties of the porous layer that are described below at least refer to the physical properties of the porous layer disposed on a surface of the porous base material which surface faces the cathode of the nonaqueous electrolyte secondary battery including the laminated body.

The porous layer only needs to have a weight per unit area (per surface of the porous layer) which weight is determined as appropriate in view of the strength, thickness, weight, and handleability of a laminated body. Note, however, that the porous base material ordinarily has a mass per unit area of preferably 0.5 g/m² to 20 g/m², more preferably 0.5 g/m² to 10 g/m², so as to allow a laminated body, which is used as a nonaqueous electrolyte secondary battery laminated separator, to have a higher weight energy density and a higher volume energy density. If the weight per unit area of the porous layer is beyond the above range, the nonaqueous electrolyte secondary battery will be heavy in a case where the laminated body is used as a nonaqueous electrolyte secondary battery separator.

The porous layer contains a component(s) in a volume per square meter (per surface) within a range of preferably 0.5 cm³ to 20 cm³, more preferably 1 cm³ to 10 cm³, further preferably 2 cm³ to 7 cm³. In other words, the porous layer has a component volume per unit area (per surface) within a range of preferably 0.5 cm³/m² to 20 cm³/m², more preferably 1 cm³/m² to 10 cm³/m², further preferably 2 cm³/m² to 7 cm³/m². If the porous layer has a component volume per unit area of less than 0.5 cm³/m², it will be impossible to, in a case where the laminated body is used as a nonaqueous electrolyte secondary battery separator, sufficiently prevent an internal short circuit caused by, for example, breakage of the battery. If the porous layer has a component volume per unit area of more than 20 cm³/m², the laminated body as a nonaqueous electrolyte secondary battery separator will have an increased resistance to permeation of lithium ions over the entire region of the separator. Thus, repeating charge-and-discharge cycles will degrade the cathode, with the result of a degraded discharge rate characteristic and a degraded cycle characteristic.

The porous layer has a porosity of preferably 20% by volume to 90% by volume, more preferably 30% by volume to 80% by volume, in order to achieve sufficient ion permeability. A pore size of each of pores of the porous layer is preferably not more than 3 μm and more preferably not more than 1 μm, so that the porous layer and a nonaqueous electrolyte secondary battery separator including the porous layer can have sufficient ion permeability.

<Crystal Forms of PVDF-Based Resin>

The PVDF-based resin in the porous layer in accordance with an embodiment of the present invention contains crystal form α in an amount of not less than 36 mol %, preferably not less than 39 mol %, more preferably not less than 60 mol %, further preferably not less than 70 mol %, with respect to 100 mol % of the total amount of crystal form α and crystal form contained. Further, the amount of crystal form α is preferably not more than 95 mol %. Containing crystal form α in an amount of not less than 36 mol % allows a laminated body including the porous layer to be used as a member of a nonaqueous electrolyte secondary battery such as a nonaqueous electrolyte secondary battery separator that is not easily curled.

A laminated body in accordance with an embodiment of the present invention can prevent itself from curling presumably because, for example, (i) a smaller content of the PVDF-based resin having crystal form β, which PVDF-based resin strongly adheres to the porous base material, allows the porous layer to be deformed to only a moderately smaller degree in response to deformation of the porous base material and/or (ii) a larger content of the PVDF-based resin having crystal form α, which PVDF-based resin is high in rigidity, allows the porous layer to be more resistant to deformation.

The PVDF-based resin having crystal form α is arranged such that the polymer of the PVDF-based resin contains a PVDF skeleton having molecular chains including a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 60°), wherein two or more such conformations are chained consecutively as follows:

$$\text{(TG}\overline{\text{TG}}\text{ Structure)} \qquad \text{[Math. 1]}$$

and the molecular chains each have the following type:

$$\text{TG}\overline{\text{TG}} \qquad \text{[Math. 2]}$$

wherein the respective dipole moments of C—F$_2$ and C—H$_2$ bonds each have a component perpendicular to the molecular chain and a component parallel to the molecular chain.

The PVDF-based resin having crystal form α has characteristic peaks (characteristic absorptions) at around 1,212 cm$^{-1}$, around 1,183 cm$^{-1}$, and around 765 cm$^{-1}$ in its IR spectrum. The PVDF-based resin having crystal form α has characteristic peaks at around 2θ=17.7°, around 2θ=18.3°, and around 2θ=19.9° in a powder X-ray diffraction analysis.

The PVDF-based resin having crystal form β is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The PVDF-based resin having crystal form β may be arranged such that the polymer of the PVDF-based resin contains a PVDF skeleton that has a TT-type conformation in its entirety. The PVDF-based resin having crystal form β may alternatively be arranged such that a portion of the PVDF skeleton has a TT-type conformation and that the PVDF-based resin having crystal form β has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii)

the respective dipole moments of C—$F_2$ and C—$H_2$ bonds each have a component perpendicular to the molecular chain.

The PVDF-based resin having crystal form β has characteristic peaks (characteristic absorptions) at around 1,274 $cm^{-1}$, around 1,163 $cm^{-1}$, and around 840 $cm^{-1}$ in its IR spectrum. The PVDF-based resin having crystal form β has a characteristic peak at around 2θ=210 in a powder X-ray diffraction analysis.

A PVDF-based resin having crystal form γ is arranged such that the polymer of the PVDF-based resin contains a PVDF skeleton that has a conformation in which TT-type conformations and TG-type conformations appear consecutively and alternately. The PVDF-based resin having crystal form γ has characteristic peaks (characteristic absorptions) at around 1,235 $cm^{-1}$ and around 811 $cm^{-1}$ in its IR spectrum. The PVDF-based resin having crystal form γ has a characteristic peak at around 2θ=18° in a powder X-ray diffraction analysis.

<Method for Calculating Content Rates of Crystal Form α and Crystal Form β in PVDF-Based Resin>

The respective content rates of crystal form α and crystal form β in the PVDF-based resin can be calculated by, for example, the methods (i) to (iii) below.

(i) Calculation formula $$\text{Law of Beer:} A = \varepsilon b C \quad (1)$$

where A represents an absorbance, ε represents a molar extinction coefficient, b represents an optical path length, and C represents a concentration.

Assuming that on the basis of the above formula (1), $A^\alpha$ represents the absorbance of the characteristic absorption of crystal form α, $A^\beta$ represents the absorbance of the characteristic absorption of crystal form β, $\varepsilon^\alpha$ represents the molar extinction coefficient of the PVDF-based resin having crystal form α, $\varepsilon^\beta$ represents the molar extinction coefficient of the PVDF-based resin having crystal form β, $\varepsilon^\alpha$ represents the concentration of the PVDF-based resin having crystal form α, and $C^\beta$ represents the concentration of the PVDF-based resin having crystal form β, the respective proportions of the respective absorbances of crystal form α and crystal form β are expressed as follows:

$$A^\beta/A^\alpha = (\varepsilon^\beta/\varepsilon^\alpha) \times (C^\beta/C^\alpha) \quad (1a)$$

Assuming that a correction factor ($\varepsilon^\beta/\varepsilon^\alpha$) for the molar extinction coefficient is EP/a, the content rate $F(\beta)=(C^\beta/(C^\alpha+C^\beta))$ of the PVDF-based resin having crystal form β with respect to the crystal form α and crystal form β combined is expressed by the following formula (2a):

$$F(\beta) = \{(1/E^{\beta/\alpha}) \times (A^\alpha/A^\beta)\}/\{1+(1/E^{\beta/\alpha}) \times (A^\alpha/A^\beta)\} = \quad (2a)$$

$$A^\beta / \{(E^{\beta/\alpha} \times A^\alpha) + A^\beta\}$$

Thus, in a case where the correction factor $E^{\beta/\alpha}$ is determined, the content rate F(β) of the PVDF-based resin having crystal form β with respect to the crystal form α and crystal form β combined can be calculated from an actual measurement of the absorbance $A^\alpha$ of the characteristic absorption of crystal form α and an actual measurement of the absorbance $A^\beta$ of the characteristic absorption of crystal form β. Further, the content rate F(α) of the PVDF-based resin having crystal form α with respect to the crystal form α and crystal form β combined can be calculated from F(β) calculated as above.

(ii) Method for Determining Correction Factor $E^{\beta/\alpha}$

A sample of a PVDF-based resin having only crystal form α is mixed with a sample of a PVDF-based resin having only crystal form β for preparation of a sample with a known content rate F(β) of the PVDF-based resin having crystal form β. The IR spectrum of the prepared sample is measured. Then, measurements are made of the absorbance (peak height) $A^\alpha$ of the characteristic absorption of crystal form α and the absorbance (peak height) $A^\beta$ of the characteristic absorption of crystal form β in the IR spectrum measured above.

Subsequently, $A^\alpha$, $A^\beta$, and F(β) are substituted into the formula (3a) below, into which the formula (2a) is solved for $E^{\beta/\alpha}$, to determine a correction factor $E^{\beta/\alpha}$.

$$E^{\beta/\alpha} = \{A^\beta \times (1 - F(\beta))\}/(A^\alpha \times F(\beta)) \quad (3a)$$

Measurements are made of respective IR spectrums of a plurality of samples having respective mixing ratios different from each other. The respective correction factors $E^{\beta/\alpha}$ of the plurality of samples are determined by the above method, and the average of the correction factors $E^{\beta/\alpha}$ is then calculated.

(iii) Calculation of Respective Content Rates of Crystal Form α and Crystal Form β in Sample For each sample, the content rate F(α) of the PVDF-based resin having crystal form α with respect to the crystal form α and crystal form β combined is calculated on the basis of the average correction factor $E^{\beta/\alpha}$ calculated in (ii) above and the result of measurement of the IR spectrum of the sample.

Specifically, the content rate F(α) is calculated as follows: A laminated body including the above porous layer is prepared by a preparation method described later. A portion of the laminated body is cut out for preparation of a measurement sample. Then, the infrared absorption spectrum of the measurement sample at wave numbers from 4000 $cm^{-1}$ to 400 $cm^{-1}$ (measurement range) is measured at room temperature (approximately 25° C.) with use of an FT-IR spectrometer (available from Bruker Optics K.K.; model: ALPHA Platinum-ATR) with a resolution of 4 $cm^{-1}$ and 512 times of scanning. The measurement sample cut out is preferably in the shape of an 80 mm×80 mm square. The size and shape of the measurement sample are, however, not limited to that; the measurement sample simply needs to be so sized as to allow its infrared absorption spectrum to be measured. Then, from the spectrum measured, the absorption intensity ($A^\alpha$) at 765 $cm^{-1}$ (characteristic absorption of crystal form α) and the absorption intensity ($A^\beta$) at 840 $cm^{-1}$ (characteristic absorption of crystal form β) are determined. The starting point and end point of a waveform formed with the wave number set as a peak are connected with a straight line, where the length between the straight line and the peak wave number (peak top) denote an absorption intensity. For crystal form α, a maximum possible absorption intensity within the wave number range of 775 $cm^{-1}$ to 745 $cm^{-1}$ is assumed to be the absorption intensity ($A^\alpha$) at 765 $cm^{-1}$. For crystal form β, a maximum possible absorption intensity within the wave number range of 850 $cm^{-1}$ to 815 $cm^{-1}$ is assumed to be the absorption intensity ($A^\beta$) at 840 $cm^{-1}$. Note that the content rate F(α)(%) of crystal form α herein is calculated on the assumption of the average correction factor $E^{\beta/\alpha}$ being 1.681 (with reference to Japanese Patent Application Publication, Tokukai, No. 2005-200623). The calculation uses the following formula (4a):

$$F(\alpha)(\%)=[1-\{\text{absorption intensity}(A^\beta) \text{ at } 840 \text{ cm}^{-1}/(\text{absorption intensity}(A^\alpha) \text{ at } 765 \text{ cm}^{-1} \times \text{correction factor}(E^{\beta/\alpha})(1.681)+\text{absorption intensity}(A^\beta) \text{ at } 840 \text{ cm}^{-1})\}] \times 100 \quad (4a)$$

[Method for Producing Porous Layer]

The porous layer in accordance with an embodiment of the present invention can be produced by, for example, a method similar to a method for producing a below-described laminated body and nonaqueous electrolyte secondary battery separator for the present invention.

<Laminated Body>

The laminated body in accordance with an embodiment of the present invention of the present invention includes the above-described porous base material and the above-described porous layer disposed on one surface or both surfaces of the porous base material.

The laminated body in accordance with an embodiment of the present invention has a thickness of preferably 5.5 μm to 45 μm, more preferably 6 μm to 25 μm.

The laminated body in accordance with an embodiment of the present invention has an air permeability of preferably 30 sec/100 mL to 1000 sec/100 mL, more preferably 50 sec/100 mL to 800 sec/100 mL in terms of Gurley values. A laminated body having such an air permeability achieves sufficient ion permeability in a case where the laminated body is used as a nonaqueous electrolyte secondary battery separator. An air permeability larger than the above range means that the laminated body has a high porosity and thus has a coarse laminated structure. This may result in the laminated body having a lower strength and thus having an insufficient shape stability at high temperatures in particular. An air permeability smaller than the above range may, on the other hand, prevent the laminated body from having sufficient ion permeability when used as a nonaqueous electrolyte secondary battery separator and thus degrade the battery characteristics of the nonaqueous electrolyte secondary battery.

A laminated body in accordance with an embodiment of the present invention may include, in addition to the above-described porous base material and porous layer, a publicly known porous film(s) such as a heat-resistant layer, an adhesive layer, and a protection layer according to need as long as such a porous film does not prevent an object of the present invention from being attained.

<Method of Producing Porous Layer and Method of Producing Laminated Body>

A porous layer and laminated body in accordance with an embodiment of the present invention may each be produced by any production method, and may each be produced by any of various methods.

In an example method, a porous layer containing a PVDF-based resin and optionally a filler is formed, through one of the processes (1) to (3) below, on a surface of a polyolefin-based resin microporous film to be a porous base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method for producing a porous layer in accordance with an embodiment of the present invention can be prepared normally by (i) dissolving, in a solvent, a resin to be contained in the porous layer for the present embodiment and (ii) dispersing, in the solvent, fine particles to be contained in the porous layer in accordance with an embodiment of the present invention.

(1) A process of (i) coating a surface of a porous base material with a coating solution containing fine particles of a PVDF-based resin to be contained in a porous layer and optionally fine particles of a filler and (ii) drying the surface of the porous base material to remove the solvent (dispersion medium) from the coating solution for formation of a porous layer.

(2) A process of (i) coating a surface of a porous base material with a coating solution containing fine particles of a PVDF-based resin to be contained in a porous layer and optionally fine particles of a filler and then (ii) immersing the porous base material into a deposition solvent (which is a poor solvent for the PVDF-based resin) for deposition of a porous layer containing the PVDF-based resin and optionally the filler.

(3) A process of (i) coating a surface of a porous base material with a coating solution containing fine particles of a PVDF-based resin to be contained in a porous layer and optionally fine particles of a filler and then (ii) making the coating solution acidic with use of a low-boiling-point organic acid for deposition of a porous layer containing the PVDF-based resin and optionally the filler.

The solvent (dispersion medium) in the coating solution may be any solvent that does not adversely affect the porous base material, that allows a PVDF-based resin to be dissolved or dispersed therein uniformly and stably, and that allows a filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the PVDF-based resin contained in the coating solution. The solvent (dispersion medium) can be efficiently removed from the coating solution by (i) immersing, in the solvent X, a porous base material to which the coating solution has been applied and on which a coating film has been formed, for replacement of the solvent (dispersion medium) in the coating film on the porous base material or a support with the solvent X and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

The coating solution may be prepared by any method that allows the coating solution to satisfy conditions such as the resin solid content (resin concentration) and the fine-particle amount that are necessary to produce a desired porous layer. Specific examples of the method for preparing a coating solution include a mechanical stirring method, an ultrasonic dispersion method, a high-pressure dispersion method, and a media dispersion method. The fine particles may be dispersed in the solvent (dispersion medium) with use of a conventionally publicly known dispersing device such as a three-one motor, a homogenizer, a medium-type dispersing device, or a pressure-type dispersing device. Further, the coating solution may be prepared simultaneously with wet grinding of fine particles by supplying into a wet grinding device a liquid in which a resin is dissolved or swollen or an emulsified liquid of a resin during wet grinding carried out to produce fine particles having a desired average particle diameter. In other words, the wet grinding of fine particles and the preparation of a coating solution may be carried out simultaneously in a single step. The coating solution may contain an additive(s) such as a dispersing agent, a plasticizing agent, a surfactant, and a pH adjusting agent as a component(s) other than the resin and the fine particles as long as such an additive does not prevent an object of the present invention from being attained. The additive may be added in an amount that does not prevent an object of the present invention from being attained.

The coating solution may be applied to the porous base material by any method, that is, a porous layer may be formed by any method on a surface of a porous base material that may have been subjected to a hydrophilization treatment as necessary. In a case where a porous layer is disposed on each of both surfaces of the porous base material, (i) a sequential deposition method may be used, in which a porous layer is formed on one surface of the porous base material, and another porous layer is subsequently formed on the other surface of the porous base material, or (ii) a simultaneous deposition method may be used, in which porous layers are formed simultaneously on both surfaces of the porous base material. A porous layer can be formed (that is, a laminated body can be produced) by, for example, (i) a method of applying the coating solution directly to a surface of the porous base material and then removing the solvent (dispersion medium), (ii) a method of applying the coating solution to an appropriate support, removing the solvent (dispersion medium) for formation of a porous layer, then pressure-bonding the porous layer to the porous base material, and peeling the support off, (iii) a method of applying the coating solution to a surface of an appropriate support, then pressure-bonding the porous base material to that surface, then peeling the support off, and then removing the solvent (dispersion medium), or (iv) a method of immersing the porous base material into the coating solution for dip coating and then removing the solvent (dispersion medium). The thickness of the porous layer can be controlled by adjusting, for example, the thickness of the coating film in a wet state (wet) after the coating, the weight ratio between the resin and the fine particles, and the solid content concentration (that is, the sum of the resin concentration and the fine-particle concentration) of the coating solution. The support can be, for example, a resin film, a metal belt, or a drum.

The coating solution may be applied to the porous base material or support by any method that can achieve a necessary weight per unit area and a necessary coating area. The coating solution can be applied by a conventionally publicly known method. Specific examples include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray coating method.

The solvent (dispersion medium) is typically removed by a drying method. Examples of the drying method include natural drying, air-blow drying, heat drying, and drying under reduced pressure. The solvent (dispersion medium) can, however, be removed by any method that allows the solvent (dispersion medium) to be removed sufficiently. The solvent (dispersion medium) contained in the coating solution may be replaced with another solvent before a drying operation. The solvent (dispersion medium) can be replaced with another solvent for removal by, for example, a method of (i) preparing another solvent (hereinafter referred to as "solvent X") that dissolves the solvent (dispersion medium) contained in the coating solution and that does not dissolve the resin contained in the coating solution, (ii) immersing the porous base material or support, to which the coating solution has been applied and on which a coating film has been formed, into the solvent X to replace the solvent (disperse medium) in the coating film on the porous base material or support with the solvent X, and (iii) evaporating the solvent X. This method allows the solvent (dispersion medium) to be removed efficiently from the coating solution. In a case where the coating film, formed on the porous base material or support by applying the coating solution thereto, is heated when removing the solvent (dispersion medium) or solvent X from the coating film, the coating film is desirably heated at a temperature that does not decrease the air permeability of the porous base material, specifically within a range of 10° C. to 120° C., preferably within a range of 20° C. to 80° C., to prevent pores in the porous base material from contracting to decrease the air permeability of the porous base material.

The solvent (dispersion medium) is preferably removed by, in particular, a method of applying the coating solution to a base material and then drying the base material for formation of a porous layer. This arrangement makes it possible to produce a porous layer having a smaller porosity variation and fewer wrinkles.

The above drying can be carried out with the use of a normal drying device.

The porous layer normally has, on one surface of the porous base material, an applied amount (weight per unit area) within a range of preferably 0.5 g/m$^2$ to 20 g/m$^2$, more preferably 0.5 g/m$^2$ to 10 g/m$^2$, further preferably 0.5 g/m$^2$ to 1.5 g/m$^2$, in terms of the solid content in view of adhesiveness to an electrode and ion permeability. This means that the amount of the coating solution to be applied to the porous base material is preferably adjusted so that the porous layer in a laminated body or nonaqueous electrolyte secondary battery separator to be produced has an applied amount (weight per unit area) within the above range.

In a case where an additional layer such as a heat-resistant layer is to be disposed on the laminated body, such a heat-resistant layer can be disposed by a method similar to the above method except that the resin for the porous layer is replaced with a resin for the heat-resistant layer.

The present embodiment is arranged such that in any of the processes (1) to (3), changing the amount of resin for a porous layer which resin is to be dissolved or dispersed in a solution can adjust the volume of resin that is contained per square meter of a porous layer having undergone immersion in an electrolyte solution and that has absorbed the electrolyte solution.

Further, changing the amount of solvent in which the resin for the porous layer is to be dissolved or dispersed can adjust the porosity and average pore diameter of a porous layer having undergone immersion in an electrolyte solution.

<Method for Controlling Crystal Forms of PVDF-Based Resin>

A laminated body in accordance with an embodiment of the present invention is produced while adjustment is made of the drying conditions (for example, the drying temperature, and the air velocity and direction during drying) and/or the deposition temperature (that is, the temperature at which a porous layer containing a PVDF-based resin is deposited with use of a deposition solvent or a low-boiling-point organic acid) for the above-described method to control the crystal forms of the PVDF-based resin to be contained in a porous layer to be formed. Specifically, a laminated body in accordance with an embodiment of the present invention can be produced while the drying conditions and the deposition temperature are adjusted so that the PVDF-based resin contains crystal form α in an amount of not less than 36 mol % (preferably not less than 39 mol %, more preferably not less than 60 mol %, further preferably not less than 70 mol %; preferably not more than 95 mol %) with respect to 100 mol % of the total amount of the crystal form α and crystal form β contained.

The drying conditions and the deposition temperature, which are adjusted so that the PVDF-based resin contains crystal form α in an amount of not less than 36 mol % with respect to 100 mol % of the total amount of the crystal form α and crystal form β contained, may be changed as appropriate by changing, for example, the method for producing a porous layer, the kind of solvent (dispersion medium) to be used, the kind of deposition solvent to be used, and/or the kind of low-boiling-point organic acid to be used.

In a case where a deposition solvent is not used and the coating solution is simply dried as in the process (1), the drying conditions may be changed as appropriate by adjusting, for example, the amount of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

Embodiment 2: Nonaqueous Electrolyte Secondary Battery Member; Embodiment 3: Nonaqueous Electrolyte Secondary Battery A nonaqueous electrolyte secondary battery member in accordance with Embodiment 2 of the present invention includes a cathode, the laminated body in accordance with Embodiment 1 of the present invention, and an anode that are arranged in this order. A nonaqueous electrolyte secondary battery in accordance with Embodiment 3 of the present invention includes the laminated body in accordance with Embodiment 1 as a separator, and preferably includes the nonaqueous electrolyte secondary battery member in accordance with Embodiment 2 of the present invention. The nonaqueous electrolyte secondary battery in accordance with Embodiment 3 of the present invention further includes a nonaqueous electrolyte.

[Nonaqueous Electrolyte]

A nonaqueous electrolyte in accordance with an embodiment of the present invention is a nonaqueous electrolyte in general use for a nonaqueous electrolyte secondary battery, and is not limited to any particular one.

Examples of the nonaqueous electrolyte include a nonaqueous electrolyte prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte in accordance with an embodiment of the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. The present embodiment may use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is further preferable. The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

[Cathode]

The cathode is normally a sheet-shaped cathode including (i) a cathode mix containing a cathode active material, an electrically conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate.

Further, the complex lithium nickelate more preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85%, further preferably not less than 90%, is particularly preferable because a nonaqueous electrolyte secondary battery including a cathode containing the above active material has an excellent in cycle characteristic for use as a high-capacity battery.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binding agent functions also as a thickening agent.

The cathode mix may be prepared by, for example, a method of applying pressure to the cathode active material, the electrically conductive material, and the binding agent on the cathode current collector or a method of using an appropriate organic solvent so that the cathode active material, the electrically conductive material, and the binder are in a paste form.

Examples of the cathode current collector include electric conductors such as Al, Ni, and stainless steel. Among these, Al is preferable as it is easy to process into a thin film and less expensive.

The sheet-shaped cathode may be produced, that is, the cathode mix may be supported by the cathode current collector, through, for example, a method of applying pressure to the cathode active material, the electrically conductive material, and the binding agent on the cathode current collector to form a cathode mix thereon or a method of (i) using an appropriate organic solvent so that the cathode active material, the electrically conductive material, and the binder are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

[Anode]

The anode is normally a sheet-shaped anode including (i) an anode mix containing an anode active material and (ii) an anode current collector supporting the anode mix thereon. The sheet-shaped anode preferably contains the above electrically conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals such as aluminum (Al), lead (Pb), tin (Sn), bismuth (Bi), or silicon (Si), each of which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_{3-x}M_xN$ (where M represents a transition metal)). Of the above anode active materials, a carbonaceous material that contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the cathode. The anode active material may alternatively be a mixture of graphite and silicon, preferably containing Si at a proportion of not less than 5%, more preferably not less than 10%, with respect to C in the graphite.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel. Among these, Cu is preferable as it is not easily alloyed with lithium in the case of a lithium-ion secondary battery in particular and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes the above electrically conductive auxiliary agent and binding agent.

A nonaqueous electrolyte secondary battery member in accordance with an embodiment of the present invention can be produced by, for example, a method of arranging the cathode, the above-described laminated body, and the anode in this order. A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery member and the nonaqueous electrolyte secondary battery may each be produced through any method, and may each be produced through a conventionally publicly known method.

The nonaqueous electrolyte secondary battery member in accordance with an embodiment of the present invention and the nonaqueous electrolyte secondary battery in accordance with an embodiment of the present invention each include a porous base material which (i) has a piercing strength of not less than 26.0 gf/g/m$^2$, which piercing strength is measured with respect to a weight per unit area of a porous base material and (ii) satisfies the above Expression (1). Therefore, surface-wise uniformity in distance between electrodes is maintained even in a case where an electrode mix expands during charge and discharge. Hence, the nonaqueous electrolyte secondary battery in accordance with an embodiment of the present invention and a nonaqueous electrolyte secondary battery including the nonaqueous electrolyte secondary battery member in accordance with an embodiment of the present invention each have (i) an excellent discharge output characteristic and (ii) an even more increased rate characteristic maintaining ratio after a charge and discharge cycle. A nonaqueous electrolyte secondary battery member in accordance with an embodiment of the present invention and a nonaqueous electrolyte secondary battery of the present invention each include the above-described porous layer, which contains a polyvinylidene fluoride-based resin (PVDF-based resin), the PVDF-based resin containing crystal form α in an amount of not less than 36 mol % with respect to 100 mol % of the total amount of the crystal form α and crystal form β contained. The nonaqueous electrolyte secondary battery member in accordance with an embodiment of the present invention and the nonaqueous electrolyte secondary battery in accordance with an embodiment of the present invention are not easily curled as a result.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss the present invention in greater detail with reference to Examples and Comparative Example. Note, however, that the present invention is not limited to the Examples and Comparative Example below.

[Method for Measuring Various Physical Properties, Etc. of Porous Base Material]

In each of Production Examples 1 and 2 and Comparative Examples 1 and 2, (i) a critical load value of a porous base material, (ii) a ratio of a critical load distance in a traverse direction to a critical load distance in a machine direction of the porous base material, and (iii) a cycle characteristic of a nonaqueous electrolyte secondary battery, were measured by the following method.

(Scratch Test)

The critical load value and the ratio of a critical load distance in a traverse direction to a critical load distance in a machine direction were measured by a scratch test. Any conditions and the like for the measurement other than the conditions described below were similar to those disclosed in JIS R 3255. In addition, a measurement apparatus used was a microscratch testing device (manufactured by CSEM Instruments).

(1) Porous base materials produced in Production Examples 1 and 2 and Comparative Examples 1 and 2 were each cut into a piece of 20 mm×60 mm. Then, a preparation was made by combining the piece of the porous base material and a glass plate of 30 mm×70 mm by the use of aqueous liquid glue. Then, the preparation was dried at a temperature of 25° C. for one whole day and night, so that a test sample was prepared. Note that the piece of the porous base material and the glass plate were combined with care so that no air bubbles would be made between the piece of the porous base material and the glass plate.

(2) The test sample prepared in the step (1) was placed on a microscratch testing device (manufactured by CSEM Instruments). Then, while a diamond indenter of the testing device was applying a vertical load of 0.1 N to the test sample, a table of the testing device was moved by a distance of 10 mm in a traverse direction of the porous base material at a speed of 5 mm/min. During the movement of the table, stress (force of friction) that occurred between the diamond indenter and the test sample was measured.

(3) A line graph, which shows a relationship between a displacement of the stress measured in the step (2) and the distance of the movement of the table, was made. Then, based on the line graph, the following were calculated: (i) a critical load value in the traverse direction and (ii) a critical load distance in the traverse direction.

(4) The direction of the movement of the table was changed to a machine direction, and the above steps (1) through (3) were repeated. Then, the following were calculated: (i) a critical load value in the machine direction and (ii) a critical load distance in the machine direction.

(Cycle Test)

New nonaqueous electrolyte secondary batteries which were produced in Production Examples 1 and 2 and Comparative Examples 1 and 2 and which had not been subjected to a charge and discharge cycle were each subjected to four cycles of initial charge and discharge. Each of the four cycles of the initial charge and discharge was carried out at 25° C., at a voltage ranging from 4.1 V to 2.7 V, and at an electric current value of 0.2 C. Note that 1 C is defined as a value of an electric current at which a rated capacity based on a discharge capacity at 1 hour rate is discharged for 1 hour. The same applies to the following description.

Subsequently, an initial battery characteristic maintenance rate at 55° C. was calculated according to the following Formula (4).

Initial battery characteristic maintaining ratio (%)= (discharge capacity at 20 C/discharge capacity at 0.2 C)×100 (4)

Subsequently, the nonaqueous electrolyte secondary battery was subjected to 100 cycles of charge and discharge, with each cycle being carried out at a temperature of 55° C., a constant charge electric current value of 1 C, and a constant discharge electric current value of 10 C. Subsequently, an initial battery characteristic maintenance rate after 100 cycles was calculated according to the following Formula (5).

Battery characteristic maintaining ratio (%)=(discharge capacity at 20 C at 100th cycle/discharge capacity at 0.2 C at 100th cycle)×100 (5)

(Measurement of Piercing Strength)

A porous base material was fixed with a washer of 12 mmφ by use of a handy-type compression tester (KATO TECH CO., LTD.; model No. KES-G5). Piercing strength of the porous base material was defined as a maximum stress (gf) obtained by piercing the porous base material with a pin at 200 mm/min. The pin used in the measurement had a pin diameter of 1 mmφ and a tip radius of 0.5 R.

Production Example 1

<Production of Nonaqueous Electrolyte Secondary Battery Separator>

Ultra-high molecular weight polyethylene powder (GUR4032, manufactured by Ticona Corporation, weight-average molecular weight: 4,970,000) and polyethylene wax (FNP-0115, manufactured by Nippon Seiro Co., Ltd.) having a weight-average molecular weight of 1000 were mixed at a ratio of 72% by weight:29% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average particle size of 0.1 μm was further added so as to account for 37% by volume of a total volume of the resultant mixture. Then, the resultant mixture while remaining a powder was mixed with the use of a Henschel mixer, so that a mixture 1 was obtained. Then, the mixture 1 was melted and kneaded with the use of a twin screw kneading extruder, so that a polyolefin resin composition 1 was obtained. Then, the polyolefin resin composition 1 was rolled with the use of a rolling mill roll at a circumferential velocity of 4.0 m/min, so that a rolled sheet 1 was obtained. Then, the rolled sheet 1 was immersed in a hydrochloric acid aqueous solution (containing 4 mol/L of hydrochloric acid and 0.5% by weight of a nonionic surfactant) so as to remove the calcium carbonate from the rolled sheet 1. Then, the resultant sheet was stretched with a stretch magnification of 7.0 times (ratio of the stretch temperature to the stretch magnification=14.3) at 100° C. Furthermore, the resultant sheet was subjected to heat fixation at 123° C. so that a porous base material 1 was obtained. The weight per unit area of the porous base material 1 thus obtained was 5.4 g/m². The porous base material 1 thus obtained was designated as a nonaqueous electrolyte secondary battery separator 1.

<Preparation of Nonaqueous Electrolyte Secondary Battery>

(Cathode)

A commercially available cathode was used that was produced by applying $LiNi_{0.5}Mn_{0.3}Co_{0.2}O_2$/electrically conductive material/PVDF (weight ratio 92:5:3) to an aluminum foil. The aluminum foil was partially cut off so that a cathode active material layer was present in an area of 40 mm×35 mm and that area was surrounded by an area with a width of 13 mm in which area no cathode active material layer was present. The cutoff was used as a cathode. The cathode active material layer had a thickness of 58 μm and a density of 2.50 g/cm³.

(Anode)

A commercially available anode was used that was produced by applying graphite/styrene-1,3-butadiene copolymer/sodium carboxymethyl cellulose (weight ratio 98:1:1) to a copper foil. The copper foil was partially cut off so that an anode active material layer was present in an area of 50 mm×40 mm and that area was surrounded by an area with a width of 13 mm in which area no anode active material layer was present. The cutoff was used as an anode. The anode active material layer had a thickness of 49 μm and a density of 1.40 g/cm³.

(Preparation of Nonaqueous Electrolyte Secondary Battery)

In a laminate pouch, the cathode, the porous base material 1 (electrolyte secondary battery separator 1), and the anode were laminated (disposed) in this order so as to obtain a nonaqueous electrolyte secondary battery member 1. During this operation, the cathode and the anode were arranged so that the cathode active material layer of the cathode had a main surface that was entirely covered by the main surface of the anode active material layer of the anode.

Subsequently, the nonaqueous electrolyte secondary battery member was put into a bag of a laminate of an aluminum layer and a heat seal layer. Further, 0.25 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

Production Example 2

A polyolefin resin composition 2 was obtained as in Example 1 except that (i) the amount of ultra-high molecular weight polyethylene powder (GUR4032, manufactured by Ticona Corporation, weight-average molecular weight: 4,970,000) was set to 70% by weight, (ii) the amount of polyethylene wax (FNP-0115, manufactured by Nippon Seiro Co., Ltd.) having a weight-average molecular weight of 1000 was set to 30% by weight, and (iii) calcium carbonate (manufactured by Maruo Calcium Co., Ltd.) having an average particle size of 0.1 μm was used so as to account for 36% by volume of a total volume of the resultant mixture. Then, the polyolefin resin composition 2 was rolled with the use of a rolling mill roll at a circumferential velocity of 3.0 m/min, so that a rolled sheet 2 was prepared. Then, the rolled sheet 2 was subjected to removal of the calcium carbonate, stretching, and heat fixation as in Production Example 1 except that (i) the stretch temperature was set to 105° C., (ii) the stretch magnification was set to 6.2 times (ratio of the stretch temperature to the stretch magnification=16.9), and (iii) the heat fixation temperature was set to 120° C., so that a porous base material 2 was obtained. The weight per unit area of the porous base material 2 thus obtained was 6.9 g/m². The porous base material 2 thus obtained was designated as a nonaqueous electrolyte secondary battery separator 2.

A nonaqueous electrolyte secondary battery 2 was prepared by a method similar to the method used in Production Example 1 except that the porous base material 1 was replaced with the porous base material 2.

Comparative Example 1

Ultra-high molecular weight polyethylene powder (GUR2024, manufactured by Ticona Corporation, weight-average molecular weight: 4,970,000) and polyethylene wax (FNP-0115, manufactured by Nippon Seiro Co., Ltd.) having a weight-average molecular weight of 1000 were mixed at a ratio of 68% by weight:32% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average particle size of 0.1 μm was further added so as to account for 38% by volume of a total volume of the resultant mixture. Then, the resultant mixture while remaining a powder was mixed with the use of a Henschel mixer, so that a mixture 4 was obtained. Then, the mixture 4 was melted and kneaded with the use of a twin screw kneading extruder, so that a polyolefin resin composition 4 was obtained. Then, the polyolefin resin composition 4 was rolled with the use of a rolling mill roll at a circumferential velocity of 2.5 m/min, so that a rolled sheet 4 was obtained. Then, the rolled sheet 4 was immersed in a hydrochloric acid aqueous solution (containing 4 mol/L of hydrochloric acid and 0.5% by weight of a nonionic surfactant) so as to remove the calcium carbonate from the rolled sheet 4. Then, the resultant sheet was stretched with a stretch magnification of 6.2 times (ratio of the stretch temperature to the stretch magnification=16.1) at 100° C. Furthermore, the resultant sheet was subjected to heat fixation at 126° C. so that a porous base material 3 was obtained. The weight per unit area of the porous base material 3 thus obtained was 6.4 g/m². The porous base material 3 was to be used as a nonaqueous electrolyte secondary battery separator 3.

A nonaqueous electrolyte secondary battery 3 was prepared by a method similar to the method used in Production Example 1 except that the porous base material 1 was replaced with the porous base material 3.

Comparative Example 2

A commercially available polyolefin separator (weight per unit area: 13.9 g/m²) was designated as a porous base material 4 (nonaqueous electrolyte secondary battery separator 4).

A nonaqueous electrolyte secondary battery 4 was prepared by a method similar to the method used in Production Example 1 except that the porous base material 1 was replaced with the porous base material 4.

The following Table 1 shows the following properties of the respective rolling mill rolls in Production Examples 1 and 2 and Comparative Example 1: (i) a circumferential velocity, (ii) a stretch temperature, (iii) a stretch magnification, and (iv) a ratio of a stretch temperature to a stretch magnification.

TABLE 1

|  | Circumferential velocity of rolling mill roll [m/min] | Stretch temperature [° C.] | Stretch magnification [%] | Stretch temperature/ Stretch magnification [° C./%] |
|---|---|---|---|---|
| Production Example 1 | 4.0 | 100 | 7.0 | 14.3 |
| Production Example 1 | 3.0 | 105 | 6.2 | 16.9 |
| Comparative Example 1 | 2.5 | 100 | 6.2 | 16.1 |

[Measurement Results]

Each of the nonaqueous electrolyte secondary battery separators 1 through 4 obtained in Production Examples 1 and 2 and Comparative Examples 1 and 2 was subjected to the scratch test so as to measure (i) respective "critical loads" in a traverse direction and in a machine direction and (ii) respective "critical load distances" in the traverse direction and in the machine direction. Table 2 shows the measurement results.

The cycle characteristics of the nonaqueous electrolyte secondary batteries 1 through 4 obtained in Production Examples 1 and 2 and Comparative Examples 1 and 2 were measured by the method described above. Table 2 shows the measurement results.

TABLE 2

|  | Piercing strength with respect to weight per unit area [gf/g/m²] | Scratching direction | Critical load distance [mm] | \|1 − TD/MD\| | Rate characteristic [%] after 100 cycles |
|---|---|---|---|---|---|
| Production Example 1 | 64.1 | MD | 3.82 | 0.37 | 55 |
|  |  | TD | 2.42 |  |  |
| Production Example 2 | 52.5 | MD | 4.84 | 0.42 | 52 |
|  |  | TD | 2.83 |  |  |
| Comparative Example 1 | 67.0 | MD | 4.53 | 0.55 | 37 |
|  |  | TD | 2.06 |  |  |
| Comparative Example 2 | 25.0 | MD | 4.18 | 0.57 | 18 |
|  |  | TD | 1.80 |  |  |

CONCLUSION

As shown in Table 2, it was confirmed that (i) according to each of the nonaqueous electrolyte secondary battery separators 3 and 4 produced in Comparative Examples 1 and 2, respectively, the value of "1-TD/MD" was more than 0.54, that is, the value of "TD/MD" was less than 0.46, which means that critical load distances in scratch tests were highly anisotropic and (ii) the nonaqueous electrolyte secondary batteries 3 and 4, which included the nonaqueous electrolyte secondary battery separators 3 and 4, respectively, had such significantly low rate characteristics (battery characteristic maintaining ratios) after 100 cycles as 37% and 18%, respectively.

Meanwhile, it was also confirmed that (i) according to each of the nonaqueous electrolyte secondary battery separators 1 and 2 produced in Production Examples 1 and 2, the value of "1-TD/MD" was 0.00 to 0.54, that is, the value of "TD/MD" was 0.45 to 1.00, which means that critical load distances in scratch tests were slightly anisotropic and (ii) the nonaqueous secondary batteries 1 and 2, which included the nonaqueous electrolyte secondary battery separators 1 and 2, respectively, each had a rate characteristic (battery characteristic maintaining ratio) after 100 cycles of not less than 52%. This confirmed that the cycle characteristics of the nonaqueous secondary batteries 1 and 2 were superior.

[Various Methods for Measuring Physical Properties of Laminated Body]

In the Examples and Comparative Examples below, physical properties such as the α rate and curl property were measured by the following methods:

(1) Method for Calculating a Rate

An α rate (%) was measured by the method below, the α rate (%) being a molar ratio (%) of crystal form α in the PVDF-based resin contained in the porous layer in the laminated body produced in each of Examples 1 through 8 and Comparative Examples 3 and 4 below with respect to the total amount of the crystal form α and crystal form β contained in the PVDF-based resin.

An 80 mm×80 mm square was cut out from the laminated body. The infrared absorption spectrum of the cutout at wave numbers from 4000 cm$^{-1}$ to 400 cm$^{-1}$ (measurement range) was measured at room temperature (approximately 25° C.) with use of an FT-IR spectrometer (available from Bruker Optics K.K.; model: ALPHA Platinum-ATR) with a resolution of 4 cm$^{-1}$ and 512 times of scanning. Then, from the spectrum measured, the absorption intensity at 765 cm$^{-1}$ (characteristic absorption of crystal form α) and the absorption intensity at 840 cm$^{-1}$ (characteristic absorption of crystal form β) were determined. The starting point and end point of a waveform formed with the wave number set as a peak were connected with a straight line, where the length between the straight line and the peak wave number (peak top) denoted an absorption intensity. For crystal form α, a maximum possible absorption intensity within the wave number range of 775 cm$^{-1}$ to 745 cm$^{-1}$ was assumed to be the absorption intensity at 765 cm$^{-1}$. For crystal form β, a maximum possible absorption intensity within the wave number range of 850 cm$^{-1}$ to 815 cm$^{-1}$ was assumed to be the absorption intensity at 840 cm$^{-1}$.

The α rate was calculated as described above in accordance with the Formula (4a) below on the basis of a value obtained by (i) determining the absorption intensity at 765 cm$^{-1}$ corresponding to crystal form α and the absorption intensity at 840 cm$^{-1}$ corresponding to crystal form β and (ii) multiplying the absorption intensity of crystal form α by 1.681 (correction factor) with reference to Japanese Patent Application Publication, Tokukai, No. 2005-200623.

α rate (%)=[1−{absorption intensity at 840 cm$^{-1}$/(absorption intensity at 765 cm$^{-1}$×correction factor(1.681)+absorption intensity at 840 cm$^{-1}$)}]×100    (4a)

(2) Curl Measurement

An 8 cm×8 cm square was cut out from the laminated body. The cutout was kept at room temperature (approximately 25° C.) and at a dew point of −30° C. for one (1) day. The appearance of the cutout was then evaluated on the basis of the following criterion: The "C" represents a state of a complete curl, the "A" and "B" each represent a better state, and the "A" represents the most preferable state.

A: No curved ends

B: Although an end(s) is curved, the remaining portion is mostly not curved and is flat. C: Opposite ends curved into a tube shape

Example 1

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous base material produced in Production Example 1 so that the applied coating solution weighed 6.0 g per square meter of the PVDF-based resin in the coating solution. The porous film, to which the coating solution had been applied, was immersed into 2-propanol while the coating film was wet with the solvent, and was then left to stand still at 25° C. for 5 minutes. This produced a laminated porous film (1-i). The laminated porous film (1-i) produced was further immersed into other 2-propanol while the laminated porous film (1-i) was wet with the above immersion solvent, and was then left to stand still at 25° C. for 5 minutes. This produced a laminated porous film (1-ii). The laminated porous film (1-ii) produced was dried at 65° C. for 5 minutes. This produced a laminated body (1). Table 3 shows the results of evaluation of the laminated body (1).

Example 2

A laminated body (2) was prepared by a method similar to the method used in Example 1 except that the porous base material prepared in Production Example 2 was used. Table 3 shows the results of evaluation of the laminated body (2).

Example 3

A porous film to which a coating solution had been applied as in Example 1 was immersed into 2-propanol while the coating film was wet with the solvent, and was then left to stand still at 0° C. for 5 minutes. This produced a laminated porous film (3-i). The laminated porous film (3-i) produced was further immersed into other 2-propanol while the laminated porous film (3-i) was wet with the above immersion solvent, and was then left to stand still at 25° C. for 5 minutes. This produced a laminated porous film (3-ii). The laminated porous film (3-ii) produced was dried at 30° C. for 5 minutes. This produced a laminated body (3). Table 3 shows the results of evaluation of the laminated body (3).

Example 4

A porous film to which a coating solution had been applied as in Example 2 was treated by a method similar to the method used in Example 3. This produced a laminated body (4). Table 3 shows the results of evaluation of the laminated body (4).

Example 5

A porous film to which a coating solution had been applied as in Example 1 was immersed into 2-propanol while the coating film was wet with the solvent, and was then left to stand still at −5° C. for 5 minutes. This produced a laminated porous film (5-i). The laminated porous film (5-i) produced was further immersed into other 2-propanol while the laminated porous film (5-i) was wet with the above immersion solvent, and was then left to stand still at 25° C. for 5 minutes. This produced a laminated porous film (5-ii). The laminated porous film (5-ii) produced was dried at 30° C. for 5 minutes. This produced a laminated body (5). Table 3 shows the results of evaluation of the laminated body (5).

Example 6

A porous film to which a coating solution had been applied as in Example 2 was treated by a method similar to the method used in Example 5. This produced a laminated body (6). Table 3 shows the results of evaluation of the laminated body (6).

Example 7

A porous film to which a coating solution had been applied as in Example 1 was immersed into 2-propanol while the coating film was wet with the solvent, and was then left to stand still at −10° C. for 5 minutes. This produced a laminated porous film (7-i). The laminated porous film (7-i) produced was further immersed into other 2-propanol while the laminated porous film (7-i) was wet with the above immersion solvent, and was then left to stand still at 25° C. for 5 minutes. This produced a laminated porous film (7-ii). The laminated porous film (7-ii) produced was dried at 30° C. for 5 minutes. This produced a laminated body (7). Table 3 shows the results of evaluation of the laminated body (7).

Example 8

A porous film to which a coating solution had been applied as in Example 2 was treated by a method similar to the method used in Example 7. This produced a laminated body (8). Table 3 shows the results of evaluation of the laminated body (8).

Comparative Example 3

A porous film to which a coating solution had been applied as in Example 1 was immersed into 2-propanol while the coating film was wet with the solvent, and was then left to stand still at −78° C. for 5 minutes. This produced a laminated porous film (9-i). The laminated porous film (9-i) produced was further immersed into other 2-propanol while the laminated porous film (9-i) was wet with the above immersion solvent, and was then left to stand still at 25° C. for 5 minutes. This produced a laminated porous film (9-ii). The laminated porous film (9-ii) produced was dried at 30° C. for 5 minutes. This produced a laminated body (9). Table 3 shows the results of evaluation of the laminated body (9).

Comparative Example 4

A porous film to which a coating solution had been applied as in Example 2 was treated by a method similar to the method used in Comparative Example 3. This produced a laminated body (10). Table 3 shows the results of evaluation of the laminated body (10).

TABLE 3

|  | α rate (%) | Curl measurement |
| --- | --- | --- |
| Example 1 | 100 | A |
| Example 2 | 100 | A |
| Example 3 | 92 | A |
| Example 4 | 87 | A |
| Example 5 | 78 | A |
| Example 6 | 74 | A |
| Example 7 | 45 | A |
| Example 8 | 36 | B |
| Comparative Example 3 | 21 | C |
| Comparative Example 4 | 27 | C |

CONCLUSION

For the laminated bodies (1) to (8), which were produced in Examples 1 to 8 and each of which included a porous layer containing a PVDF-based resin that contained crystal form α in an amount (a rate) of not less than 36% with respect to the crystal form α and crystal form β combined, the measurement results show that curls were prevented. On the other hand, for the laminated bodies (9) and (10), which were produced in Comparative Examples 3 and 4 and for each of which the α rate was less than 36%, the measurement results show that clear curls occurred.

The above indicates that a laminated body in accordance with an embodiment of the present invention which laminated body has an α rate of not less than 36% is not easily curled.

A rate characteristic (battery characteristic maintaining ratio) of a laminated body after 100 cycles of charge and discharge, that is, a cycle characteristic, depends on surface-wise uniformity in distance between electrodes of a non-aqueous electrolyte secondary battery including the laminated body. Then, the surface-wise uniformity depends on (i) plastic deformation of a surface layer of a porous base material of the laminated body and (ii) isotropy of transferability of surface stress to a surface opposite a surface facing an expanded electrode in the laminated body. The laminated bodies produced in Examples 1 to 8 were each produced with use of the porous base material produced in Production Example 1 or 2. As shown in Table 2, the porous base materials produced in Production Examples 1 and 2 each showed an excellent cycle characteristic. This indicates that the laminated bodies produced in Examples 1 through 8 each show an excellent cycle characteristic as well.

The results of Production Examples, Examples, and Comparative Examples described above show that the laminated bodies produced in Examples 1 to 8 (laminated bodies in accordance with an embodiment of the present invention) can each impart an excellent cycle characteristic to a non-aqueous electrolyte secondary battery including the laminated body as a separator and are not easily curled.

INDUSTRIAL APPLICABILITY

A laminated body in accordance with an embodiment of the present invention is not easily curled, and is suitably usable in production of a nonaqueous electrolyte secondary battery.

REFERENCE SIGNS LIST

1 Diamond indenter
2 Substrate
3 Porous base material containing polyolefin as main component

The invention claimed is:
1. A laminated body, comprising:
a porous base material containing a polyolefin-based resin as a main component; and
a porous layer which is disposed on at least one surface of the porous base material and which contains a polyvinylidene fluoride-based resin,
the porous base material having a piercing strength of not less than 26.0 gf/g/m$^2$, which piercing strength is measured with respect to a weight per unit area of the porous base material,
the polyvinylidene fluoride-based resin having a weight-average molecular weight of 500,000 to 1,500,000, the porous base material having a value in a range of 0.00 to 0.54, which value is represented by the following Expression (1):

$$|1-T/M| \tag{1}$$

where (i) T represents a distance by which the porous base material moves in a traverse direction from a starting point of measurement to a point where a critical load is obtained in a scratch test under a constant load of 0.1 N and (ii) M represents a distance by which the porous base material moves in a machine direction from a starting point of measurement to a point where a critical load is obtained in a scratch test under a constant load of 0.1 N, the polyvinylidene fluoride-based resin containing crystal form a in an amount of not less than 70 mol % with respect to 100 mol % of a total amount of the crystal form α and crystal form β contained in the polyvinylidene fluoride-based resin, where the amount of the crystal form a is calculated from an absorption intensity at around 765 $cm^{-1}$ in an IR spectrum of the porous layer, and an amount of the crystal form β is calculated from an absorption intensity at around 840 $cm^{-1}$ in the IR spectrum of the porous layer.

2. The laminated body according to claim 1, wherein the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The laminated body according to claim 1, wherein the porous layer contains a filler.

4. The laminated body according to claim 3, wherein the filler has a volume-average particle size of 0.01 μm to 10 μm.

5. A nonaqueous electrolyte secondary battery member, comprising:

a cathode;

a laminated body according to claim 1; and an anode, the cathode, the laminated body, and the anode being arranged in this order.

6. A nonaqueous electrolyte secondary battery, comprising as a separator a laminated body according to claim 1.

* * * * *